United States Patent [19]

White

[11] Patent Number: 5,460,340
[45] Date of Patent: Oct. 24, 1995

[54] AUXILIARY CONTROL OF AIRCRAFT LANDING GEAR MOVEMENT

[75] Inventor: David White, Bristol, England

[73] Assignee: British Aerospace Public Limited Company, Hampshire, United Kingdom

[21] Appl. No.: 149,339

[22] Filed: Nov. 9, 1993

[30] Foreign Application Priority Data

Nov. 12, 1992 [GB] United Kingdom .................... 9223714

[51] Int. Cl.⁶ .......................... B64C 25/10; B64C 25/58
[52] U.S. Cl. ................. 244/102 A; 244/102 SS; 244/104 FD
[58] Field of Search ........................ 244/102 R, 102 A, 244/102 SS, 104 R, 104 FP

[56] References Cited

U.S. PATENT DOCUMENTS

| | | | |
|---|---|---|---|
| 2,326,019 | 8/1943 | Dowty | 244/102 R |
| 2,735,634 | 2/1956 | Fosness | 244/104 FP |
| 2,967,682 | 1/1961 | Fullam et al. | 244/102 R |
| 3,322,376 | 5/1967 | Neilson et al. | 244/102 R |
| 3,899,147 | 8/1975 | Masclet | 244/102 R |
| 4,155,523 | 5/1979 | Morford et al. | 244/102 R |
| 4,328,939 | 5/1982 | Davies et al. | 244/102 R |
| 4,355,773 | 10/1982 | Masclet | 244/102 R |
| 4,359,199 | 11/1982 | Kramer et al. | 244/104 R |
| 4,749,152 | 6/1988 | Veaux et al. | 244/104 FP |
| 4,770,372 | 9/1988 | Ralph | 244/102 R |
| 4,892,270 | 1/1990 | Derrien et al. | 244/104 R |
| 5,029,775 | 7/1991 | Abramovitsh | 244/102 R |
| 5,039,033 | 8/1991 | Woerner et al. | 244/102 R |

FOREIGN PATENT DOCUMENTS

| | | |
|---|---|---|
| 663245 | 12/1951 | United Kingdom . |
| 1104069 | 8/1965 | United Kingdom ............ 244/104 FP |

*Primary Examiner*—Andres Kashnikow
*Assistant Examiner*—Virna Lissi Mojica
*Attorney, Agent, or Firm*—Nixon & Vanderhye

[57] ABSTRACT

Auxiliary control of extension, retraction and pivotal movement of aircraft landing gear when not in use is provided by a method of operation, apparatus for attaching to the landing gear, and an assembly comprising landing gear and apparatus. The apparatus comprises auxiliary jacking means (18, 19) attachable between relatively telescopic parts of an oleo main strut of the landing gear and between relatively pivotal parts of the oleo and of a bogie pivotally attached to a lower end of the oleo. The landing gear may thus be powered up by the auxiliary jacking means (18, 19) with the pivotal movement of the bogie (4) being controlled simultaneously during, e.g. removal, fitting or servicing of the landing gear.

3 Claims, 3 Drawing Sheets

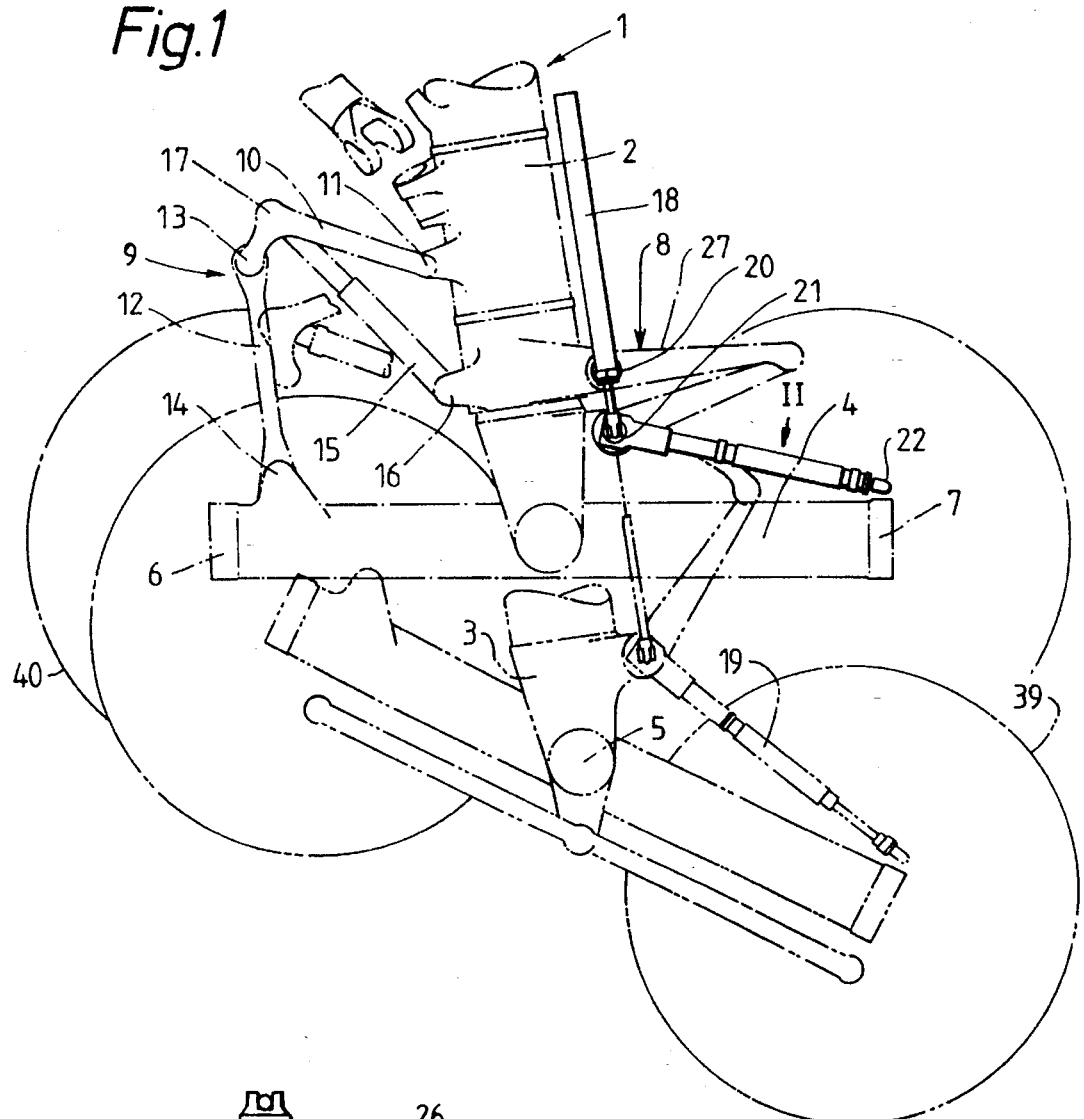
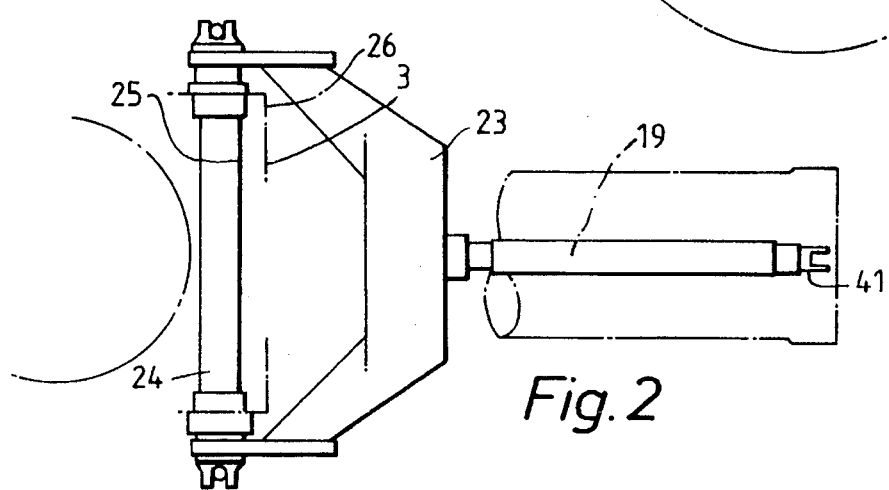

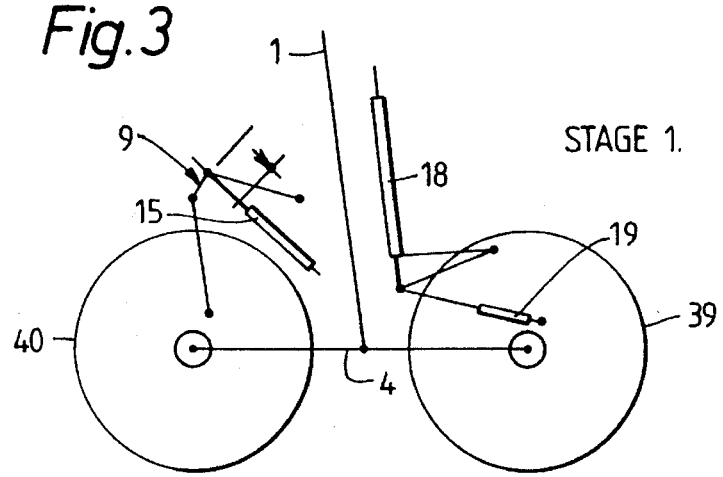
Fig.3 — STAGE 1.
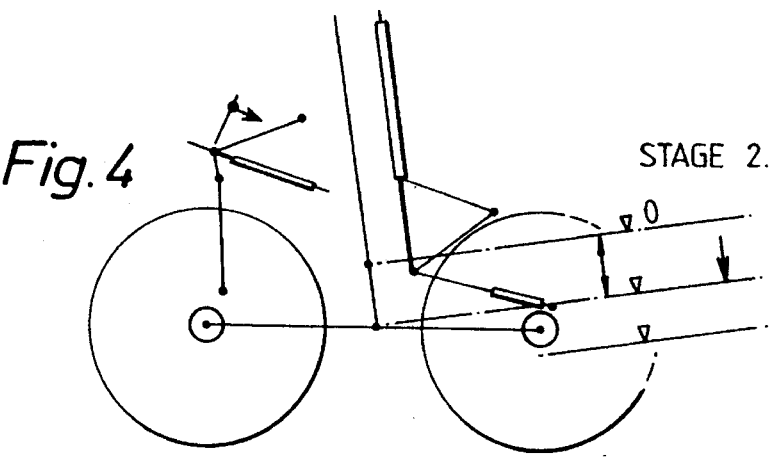
Fig.4 — STAGE 2.
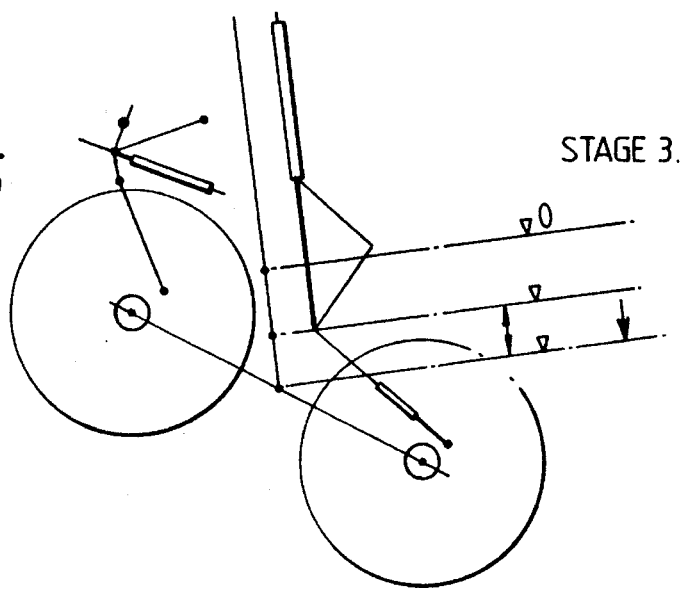
Fig.5 — STAGE 3.

AUXILIARY CONTROL OF AIRCRAFT LANDING GEAR MOVEMENT

BACKGROUND TO THE INVENTION

This invention relates to auxiliary control of movement of aircraft landing gear and more particularly to auxiliary control of extension, retraction and pivotal movement of such a landing gear having a wheeled bogie mounted for controlled pivotal movement to a lower end of an oleo telescopic main strut.

DESCRIPTION OF THE PRIOR ART

In one known type of aircraft main landing gear of the type described above telescopic extension of the main oleo strut past a certain point in its travel automatically actuates controlled pivotal movement of the bogie about a central mounting to the strut whereby, upon the oleo reaching full extension, the bogie has pivoted so that two rear wheels thereof are angled downwardly effectively to extend the length of the landing gear. The bogie is hydraulically jacked into this rotated position by an hydraulically actuated articulating mechanism acting between the bogie and the oleo strut.

When it becomes necessary to shorten or retract the landing gear for purposes of removal from the aircraft and servicing, it is necessary not only to compress the oleo strut and to overcome the weight thereof but also to hold the bogie in a level position against the unbalancing force of the weight of the hydraulic articulating mechanism.

To date, attempts to find a jacking mechanism which will retract or extend such a main landing gear in a controlled manner have resulted in devices which are cumbersome and of limited effectiveness, e.g. a standard jack under each end of the bogie being raised or lowered in unison.

OBJECT OF THE INVENTION

It is an object of the invention to provide means for extending or contracting aircraft landing gear of the type described which overcome the problems of the prior art.

SUMMARY OF THE INVENTION

According to a first aspect of the invention, there is provided a method of controlling extension, retraction and pivotal movement of aircraft landing gear when not in use, the gear comprising an oleo telescopic main strut having a bogie attached to a lower end thereof for controlled relative pivotal movement therebetween, the method including the steps of connecting first auxiliary jacking means between relatively telescopic parts of the oleo and second auxiliary jacking means between relatively pivotable parts of the oleo and bogie respectively and selectively operating said first and second auxiliary jacking means to control said relative movements as required.

A straightforward and effective method of controlling the movements of the landing gear is thus provided which can be employed at all stages of dealing with a landing gear for the purposes of removal from the aircraft, dismantling and reassembly, servicing and reinstalling on the aircraft.

Where at least one of the auxiliary jacking means comprises a piston and cylinder arrangement operated by pressurised fluid the method may include the step of actuating a fluid pressure pump to operate the at least one auxiliary jacking means. Such a pump may be used selectively to extend the length of the piston and cylinder arrangement or to reduce the length in a controlled manner by controlled pressure release in the piston and cylinder arrangement.

According to a second aspect of the invention, there is provided apparatus for controlling extension, retraction and pivotal movement of aircraft landing gear when not in use, said gear being of the type comprising an oleo telescopic main strut and a bogie attached to a lower end of the oleo for controlled relative pivotal movement therebetweeen, the apparatus comprising first auxiliary jacking means adapted for connection between relatively telescopic parts of the oleo, second auxiliary jacking means adapted for connection between respective parts of the oleo and bogie subject to said relative pivotal movement and control means to control the movement of said first and second auxiliary jacking means whereby to control said relative movements of the landing gear.

According to a third aspect of the invention there is provided an aircraft landing gear and auxiliary control assembly comprising a landing gear oleo telescopic main strut having a bogie attached to a lower end thereof for controlled relative pivotal movement therebetween, first auxiliary jacking means connected between parts of the oleo subject to relative telescopic movement, second auxiliary jacking means connected between relatively pivotal parts of the oleo and bogie respectively and control means to control jacking movement of the first and second auxiliary jacking means whereby to control said relative movements of the landing gear when said landing gear is out of use.

When at least one of said auxiliary jacking means comprises a fluid pressure operated piston and cylinder arrangement, the control means may comprise at least one fluid pressure pump selectively operable to pressurise and depressurise the at least one auxiliary jacking means whereby to control extension and contraction movement thereof.

The control means may be programmable whereby to control said telescopic and pivotal relative movements in a pre-programmed sequence, for example for operation when compressing the landing gear for removal from or fitting to the aircraft, or for carrying out such movements in a particular sequence when filling or bleeding hydraulic cavities within the landing gear.

When the control means comprises a pressure pump it may include an up/down directional control for each auxiliary jacking means, a descent control for the first auxiliary jacking means, a vent valve for the second auxiliary jacking means, all operable in conjunction with the pump.

BRIEF DESCRIPTION OF THE DRAWINGS

The invention will now be described by way of example with reference to the accompanying drawings of which:

FIG. 1 is a side elevation of an aircraft main landing gear including apparatus according to the invention showing the landing gear in fully compressed and fully extended positions.

FIG. 2 is a view on II of FIG. 1,

FIG. 3 is a schematic side view of landing gear similar to that shown in FIG. 1 including apparatus according to the invention shown in a fully compressed position, "stage 1", FIG. 4 shows the apparatus of FIG. 3 in an intermediate position, "stage 2", FIG. 5 shows the apparatus of FIG. 3 in a fully extended position, "stage 3"

DESCRIPTION OF PREFERRED EMBODIMENT

Figure 6:
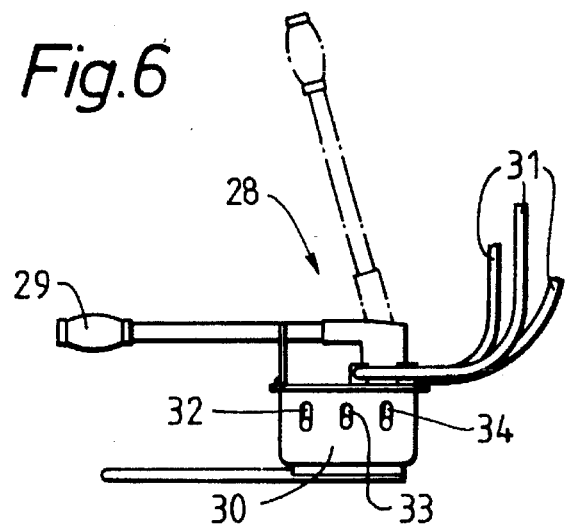
FIG. 6 is a schematic side view of a hand pump for use as control means for apparatus according to the invention.

Referring to FIG. 1, an aircraft landing gear oleo telescopic main strut 1 comprises a fixed main tube 2 and a bogie carrier 3 mounted for telescopic movement relative to the tube 2. The bogie carrier 3 carries a bogie 4 centrally mounted at a pivot 5 for relative pivotal movement with the bogie carrier 3 and adapted to carry wheel axles (not shown) at either end 6, 7 thereof.

The gear also includes a torsion linkage 8 to prevent relative rotational movement between the main tube 2 and the bogie carrier 3 and includes also an articulation linkage 9 to control relative pivotal movement of the bogie carrier 3 and bogie 4. The articulation linkage 9 comprises an upper cranked link 10 pivotally attached at one end to the main tube 2 at a pivot 11 and at the other end to a vertical link 12 at a pivot 13. The vertical link 12 is attached at its other end to the bogie 4 via a pivot 14. Pivotal movement of the bogie 4 is controlled partly by extension of the oleo 1 and partly by extension and contraction of an articulation strut "pitch trimmer" 15 connected at one end to the main tube 2 at a pivot 16 and at the other end to the cranked link 10 at a pivot 17.

Apparatus according to the invention is provided by first auxiliary jacking means in the form of a pair of oleo control struts 18 and second auxiliary jacking means in the form of a bogie control strut 19. The oleo control struts 18 and bogie control strut 19 are dual-acting hydraulically operated struts. The bogie control strut 19 has a limit stop (not shown) to prevent the bogie 4 pivoting anti-clockwise further than the position shown in FIG. 1 with the oleo fully compressed.

The oleo control struts 18 are each connected between connections 20 and 21 on parts 2 and 3 of the oleo relatively telescopic with respect to one another. The bogie control strut 19 extends between connections 21 and 22 on respective parts 3 and 4 of the oleo and bogie subject to relative pivotal movement.

Referring to FIG. 2, the view on arrow II shows the bogie control strut 19 which has a forked connection to the bogie carrier 3 of the oleo via a forked frame 23 which engages a spindle 24 engaged in a bore 25 in a boss 26 for a torque link 27 for the oleo 1.

Referring to FIG. 6, control means for the auxiliary jacking means 18, 19 are shown in the form of a hand pump 28 having a pump handle 29, a reservoir 30 and connecting pipes 31 to the control struts 18, 19. The hand pump 28 also has a minimum of three controls. These are an oleo directional control Up/Down 32, an oleo descent control Open/Closed 33 and a bogie vent valve Open/Closed 34.

Figure 7:
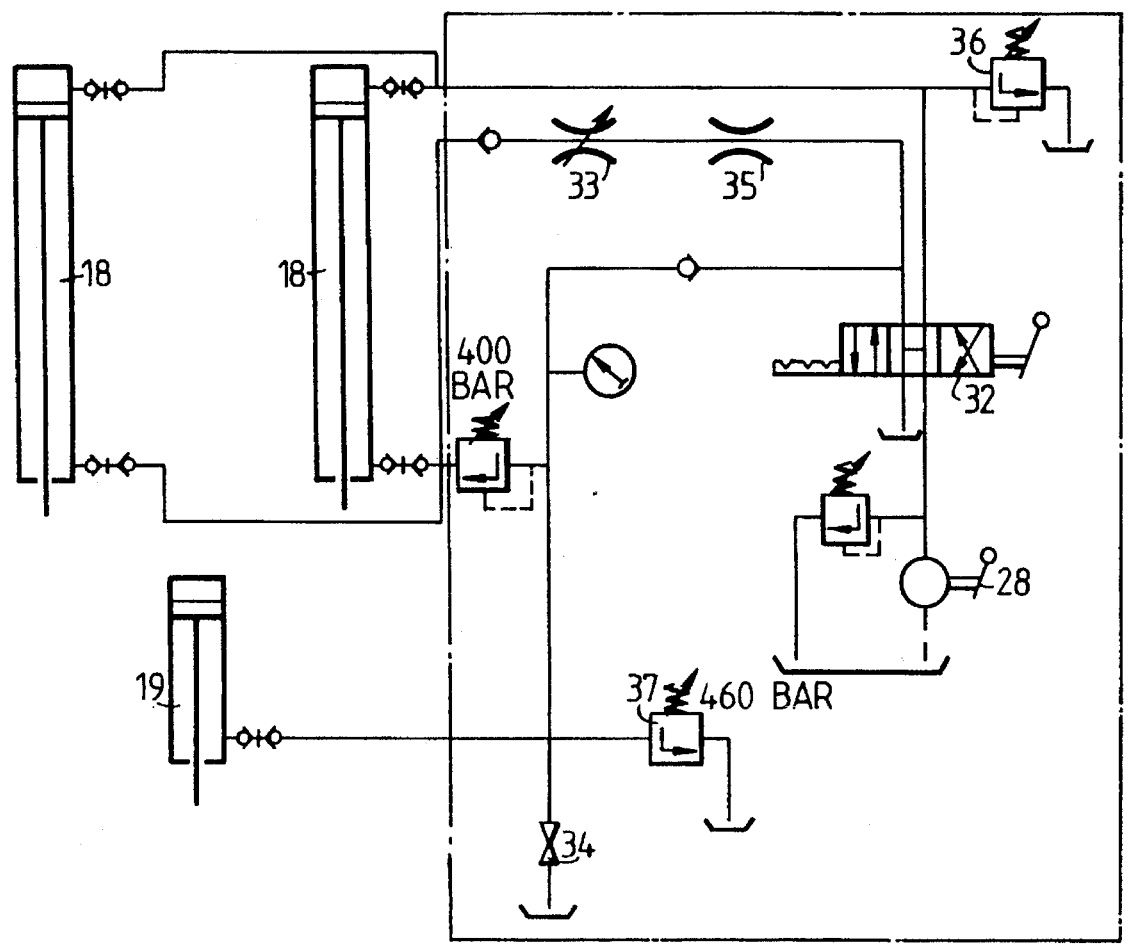
FIG. 7 is an hydraulic circuit diagram for use in the invention.

A hydraulic circuit which may be used with the hand pump 28 and oleo and bogie control struts 18, 19 is shown in FIG. 7. Equivalent reference numerals to those used in other figures are used in FIG. 7. The circuit includes an oleo descent safety control valve 35, an oleo control cylinder pressure valve 36 and a bogie control cylinder pressure valve 37.

The operation of the oleo 1 and apparatus according to the invention will now be described, including particular reference to positions of the oleo shown in FIGS. 3, 4 and 5 "stage 1, stage 2 and stage 3" respectively. Referring to FIGS. 3, 4 and 5, the articulation strut or "pitch trimmer" 15 is a powered one way hydraulic strut acting in compression only and is operable within the articulation linkage 9 to control pitch of the bogie about the oleo 1 according to the amount of telescopic extension of the bogie carrier 3 with respect to the main tube 2. The pitch trimmer 15 is unpressurised during operation of the apparatus of the invention. Upon extension of oleo 1 by telescopic movement downwards between stage 1 and stage 2, the pitch trimmer 15 is compressed to its minimum length as shown in FIG. 4. The angle of the bogie 4 with respect to the bogie carrier 3 remains constant throughout this extension. Between stage 2 and stage 3 the bogie carrier 3 continues to extend telescopically from the fixed main tube 2 but, as the pitch trimmer 15 is already fully compressed, the bogie 4 begins to articulate about pivot 5 such that rear wheels 39 drop down and front wheels 40 rise with respect to the bogie carrier 3. An effective extension of overall length of the landing gear is achieved by this method for take off of the aircraft. The net result of this feature of the landing gear however is that when it is required to extend the landing gear for reasons of servicing, bleeding of the hydraulics etc. whilst maintaining control of the bogie 4 in different build/assembly states having different centres of gravity, it is necessary to apply auxiliary control to pivotal movement of the bogie 4.

The oleo control struts 18 can be used to gag, i.e. lock in position using a rigid member, the oleo in its fully retracted position without the bogie control strut being fitted, prior to fitting to the aircraft.

Gags for the bogie control strut 19 comprise bolts that mate with clevices on the forked frame 23 to prevent any telescopic extension of the main strut 1. The bogie control strut 19 incorporates a gag comprising a locking collar (not shown) which mates with the body of the strut 19.

LANDING GEAR EXTENSION—STAGE 1 TO STAGE 2

This stage covers the extension of the oleo from its fully compressed state to a point at which the pitch trimmer 15 is fully compressed. With all wheels on or all wheels off the bogie it remains in near equilibrium during this stage however with rear wheels 39 off it is necessary to prevent anti-clockwise rotation of the bogie during lowering of the bogie carrier 3. This rotation is prevented by the limit stop in the bogie control strut 19. To prevent clockwise rotation however, if the front wheels are missing and the rear wheels fitted, the bogie control strut 19 is pressurised from the hand pump to a pressure at which it is left throughout operations.

OLEO EXTENSION FROM STAGE 2 TO STAGE 3

This stage covers the extension of the oleo from the point at which the pitch trimmer 15 is fully compressed to full extension of the landing gear. During this stage the fully compressed pitch trimmer 15 will share the unsupported mass: bogie carrier, bogie, wheels etc. with the oleo control struts 18. The pitch trimmer 15 will also oppose anti-clockwise out of balance forces e.g. forward wheels fitted only. The pitch trimmer 15 is incapable of resisting clockwise out of balance forces, e.g. aft wheels fitted only, as these will tend to extend it. Clockwise out of balance forces will be reacted by the bogie control strut 19 cylinder pressure. The auxiliary jacking means thus provides controlled extension of the oleo and control of rotation of the bogie irrespective of the state of assembly of the bogie.

EXTENSION UNDER OLEO AUXILIARY CONTROL

The oleo control struts 18 will, when pressurised, apply sufficient force to overcome frictional forces within the oleo and the hydraulic pressure in the bogie control strut 19. The oleo control struts 18 will also control the rate of descent of the bogie should the assembly state of the landing gear, e.g. all wheels on, allow the oleo to extend without any external force being applied.

During the first stage of extension, stage 1 to stage 2 the hydraulic pressure in the bogie control strut 19 will have no effect on the oleo control struts. During the second stage of extension, stage 2 to stage 3, the oleo control struts will have to overcome a component of the hydraulic force in the bogie strut 19.

RETRACTION UNDER OLEO AUXILIARY CONTROL

The oleo control struts will, when pressurised, apply sufficient force to overcome the mass of a fully fitted bogie, e.g. all wheels on, plus friction forces.

During the first stage of retraction, between stage 3 and stage 2, a component of the hydraulic force in the bogie control strut 19 will assist the oleo control struts 18. This assistance will not however continue once the pitch trimmer 15 starts to extend and the bogie control strut 19 is fully retracted, i.e. between stage 2 and stage 1.

ASSEMBLY

The oleo control struts 18 and bogie control strut 19 can be assembled to the landing gear whether fully extended or fully retracted.

The oleo control strut 18 is connected to the landing gear via two spindles (not shown at connection 20) and 24 at connection 21 which pass through bores in the main tube 2 and bogie carrier 3 respectively. The bogie control strut 19 is attached to the bogie carrier 3 via the spindle 24 inserted through the forked frame 23 and via a forked adapter 41 attached to the bogie 4.

GAGGING

Gags can only be fitted when the oleo 1 is fully compressed. The bogie 4 can be gagged by means of a locking collar which can be threaded on to a bogie control strut body thereby preventing the strut 19 from extending.

OPERATION OF SYSTEM—COMPRESSING OLEO

Close oleo descent control 33. Close bogie vent valve 34. Select "Up" on oleo directional control 32. Operate the hand pump 28 and pressurise the system. This will pressurise an annular side of the oleo control struts 18 and also the bogie control strut 19. As the oleo control struts start to shorten, system pressure will drop causing an isolator valve to open hence maintaining the pre-set pressure in the bogie control strut 19. When the oleo 1 is fully compressed the gags may be fitted.

When the gags are fitted select "Down" on the oleo directional control 32. Open the oleo descent control 33 and check that the gags are fully seated. If they are not, operate the hand pump 28 until the oleo 1 extends and brings bolts into contact with mating surfaces. Engage gag on bogie control strut 19. Open the bogie vent valve 34. The control struts 18 and 19 may now be disconnected.

OPERATION OF SYSTEM—EXTENDING OLEO

Close the oleo descent control 33. Close the bogie vent valve 34. Select "Up" on the oleo directional control 32 and operate the hand pump to pressurise the system. When the oleo is fully compressed all gags may be removed.

Select "Down" on the oleo directional control 32, open oleo descent control 33 and if the landing gear fails to extend, operate the hand pump. As the oleo extends and reaches the point at which the pitch trimmer 15 is fully compressed (see FIG. 4) and the bogie control strut 19 starts to extend, a pressure relief valve will open and vent the annular side of the strut to the reservoir 30.

When the oleo is fully extended open the bogie vent valve 34, select "Up" on the oleo directional control 32 which will vent the vent the full bore side of the oleo control strut to the reservoir 30. The control struts 18, 19 may now be removed from the landing gear.

I claim:

1. A method of controlling extension, retraction and pivotal movement of aircraft landing gear when an aircraft having said landing gear is not airborne, the gear comprising an oleo telescopic main strut having a bogie attached to a lower end thereof for controlled relative pivotal movement, the method including the steps of:

connecting first auxiliary jacking means between relatively telescopic parts of the oleo and second auxiliary jacking means between relatively pivotable parts of the oleo and bogie respectively; and selectively operating said first and second auxiliary jacking means to control said relative telescopic and pivotal movements of said strut and bogie, respectively.

2. Apparatus for controlling extension, retraction and pivotal movement of aircraft landing gear when an aircraft having said landing gear is not airborne, the gear being of the type comprising an oleo telescopic main strut and a bogie attached to a lower end of the oleo for controlled relative pivotal movement, said apparatus comprising:

first auxiliary jacking means adapted for connection between relatively telescopic parts of the oleo; and second auxiliary jacking means adapted for connection between respective parts of the oleo and bogie subject to said relative pivotal movement and control means to control the movement of said first and second auxiliary jacking means thereby controlling said relative telescopic and pivotal movements of the strut and bogie, respectively, of the landing gear.

3. An aircraft landing gear and auxiliary control assembly comprising:

a landing gear oleo telescopic main strut having a bogie attached to a lower end thereof for controlled relative pivotal movement;

first auxiliary jacking means connected between parts of said oleo subject to relative telescopic movement;

second auxiliary jacking means connected between parts of said oleo and bogie respectively subject to relative pivotal movement; and control means to control jacking movement of said first and second auxiliary jacking means thereby controlling said relative telescopic and pivotal movements of the strut and bogie, respectively, of said landing gear.

\* \* \* \* \*